(12) United States Patent
Delay et al.

(10) Patent No.: US 9,231,408 B2
(45) Date of Patent: Jan. 5, 2016

(54) MATRIX CONNECTION DEVICE FOR PHOTOVOLTAIC PANELS AND/OR WIND TURBINES

(75) Inventors: Christian Delay, Thilouze (FR); Nicolas Uhl, Savonnieres (FR); Pascal Estop, Chambray les Tours (FR)

(73) Assignee: AEG POWER SOLUTIONS B.V., Zwanenburg (NL)

( * ) Notice: Subject to any disclaimer, the term of this patent is extended or adjusted under 35 U.S.C. 154(b) by 558 days.

(21) Appl. No.: 13/701,655

(22) PCT Filed: Jun. 1, 2011

(86) PCT No.: PCT/FR2011/051256
§ 371 (c)(1),
(2), (4) Date: May 1, 2013

(87) PCT Pub. No.: WO2011/151599
PCT Pub. Date: Dec. 8, 2011

(65) Prior Publication Data
US 2013/0207474 A1    Aug. 15, 2013

(30) Foreign Application Priority Data
Jun. 4, 2010 (FR) .................................... 10 54419

(51) Int. Cl.
| H02J 1/00 | (2006.01) |
| H02J 4/00 | (2006.01) |
| H02J 3/38 | (2006.01) |

(52) U.S. Cl.
CPC . *H02J 4/00* (2013.01); *H02J 3/383* (2013.01); *H02J 3/386* (2013.01); *Y02E 10/563* (2013.01); *Y02E 10/763* (2013.01); *Y10T 307/658* (2015.04); *Y10T 307/696* (2015.04)

(58) Field of Classification Search
CPC ............. H02J 3/383; H02J 3/386; H02J 4/00; Y02E 10/563; Y02E 10/763; Y10T 307/696; Y10T 307/65
USPC .......................................................... 307/82
See application file for complete search history.

(56) References Cited

U.S. PATENT DOCUMENTS

| 5,684,385 | A | * | 11/1997 | Guyonneau | ............... | G05F 1/67 136/293 |
| 2009/0322081 | A1 | * | 12/2009 | Wagoner | ............... | H02M 7/493 290/44 |
| 2010/0109442 | A1 | * | 5/2010 | Vega Betoret | .......... | H02J 3/383 307/82 |

*Primary Examiner* — Thienvu Tran
*Assistant Examiner* — Duc M Pham
(74) *Attorney, Agent, or Firm* — Sughrue Mion, PLLC

(57) ABSTRACT

A matrix connection device disposed between n unidirectional energy sources (PV1, PV2, PVn) and n power converters (C1, C2, Cn) for the purpose of powering a common load (10), said device comprising:
n matrix switch units (I1, I2 to In), each of which comprises n link switches (Ki1, Ki2 to Kin) having their outlets connected together and having their n inlets connected to the n outlets of said photovoltaic panels and/or wind turbines;
at least one additional switch unit (In+1) comprising n switches ($K_{n+1}1$, $K_{n+1}2$ to $K_{n+1}n$) having their outlets connected together and their n inlets connected to respective ones of the n outlets of the unidirectional energy sources; and
a monitoring and control circuit (14) for starting up or not starting up said power converters as a function of the power available at each of said unidirectional energy sources, and then for keeping them switched on or for deactivating them as a function of the power consumed by each of them.

8 Claims, 3 Drawing Sheets

MATRIX CONNECTION DEVICE FOR PHOTOVOLTAIC PANELS AND/OR WIND TURBINES

CROSS REFERENCE TO RELATED APPLICATIONS

This application is a National Stage of International Application No. PCT/FR2011/051256 filed Jun. 1, 2011, claiming priority based on French Patent Application No. 1054419 filed Jun. 4, 2010, the contents of all of which are incorporated herein by reference in their entirety.

TECHNICAL FIELD

The present invention relates to the field of photovoltaic or wind-turbine energy generators and it relates more particularly to a connection device for connecting unidirectional energy sources (i.e. energy sources that are alternating current (AC) or direct current (DC) and always with the same polarity) to power converters.

PRIOR ART

The use of solar energy for powering various loads or for injecting power into an electricity grid or network is becoming increasingly generalized. In small or medium-size installations (typically of less than a few hundreds of watts), using a single converter powered by a single photovoltaic panel or by a plurality of photovoltaic panels disposed in parallel is sufficient most of the time.

Conversely, for installations that are more powerful or that are combined, i.e. that include both photovoltaic panels and wind turbines, as shown in the block diagram of FIG. 3, the arrays of photovoltaic panels 1 and 2 and the wind turbine 3 are connected to respective converters 4, 5, 6 connected to the power supply grid or to a common load 7. Unfortunately, that configuration suffers from drawbacks. Since the efficiency of the converters is a function of the consumed power, said efficiency is poor when the insolation or wind conditions are low. Similarly, since the converters need at least some minimum amount of power to start up, they are impossible to start up under low insolation or low wind, and it is therefore necessary to use an alternative source of energy or intermediate storage when the load needs to be powered under such conditions. That results in installations that are relatively complex and therefore costly and voluminous.

OBJECT AND SUMMARY OF THE INVENTION

An object of the present invention is to mitigate the above-mentioned drawbacks by proposing a connection device for connecting unidirectional energy sources to power converters that maximizes the efficiency of each converter and facilitates start-up thereof under low insolation or low wind conditions. These objects are achieved by a matrix connection device disposed between n unidirectional energy sources and at least n+1 power converters for the purpose of powering a common load, said device being characterized in that it comprises:

- n matrix switch units, each of which comprises n link switches having their outlets connected together and having their n inlets connected to the n outlets of said unidirectional energy sources, the outlet of the first unidirectional energy source being connected to each of the first switches of each of the matrix switch units, the outlet of the second unidirectional energy source being connected to each of the second switches of each of the matrix switch units and so on to the outlet of the $n^{th}$ unidirectional energy source that is connected to each of the $n^{th}$ switches of each of the matrix switch units;
- at least one additional switch unit comprising n switches having their outlets connected together and their n inlets connected to respective ones of the n outlets of said unidirectional energy sources; and
- a monitoring and control circuit for starting up or not starting up said power converters as a function of the power available at each of said unidirectional energy sources, and then for keeping them switched on or for deactivating them as a function of the power consumed by each of them.

Thus, through this matrix connection, the converters can be started up successively or simultaneously depending on the insolation or wind conditions affecting each of the energy sources (which may, for example, be photovoltaic panels or wind turbines, or a combination of both). Then, once they have been started up, the converters remain switched on or are switched off depending on the variation in the insolation or wind conditions and on the power consumed by the converters for powering the load.

The matrix connection device of the invention may further comprise n short-circuit switches for short-circuiting the outlet of each of said unidirectional energy sources, thereby enabling said available power to be measured, or indeed it may further comprise n power sensors disposed in association with said n unidirectional energy sources so as to enable said available power to be measured. Depending on the type of the energy source, said power sensor may be formed by an insolation sensor or by a sensor for measuring the speed of the wind.

Preferably, each of the switches comprises an insulated-gate bipolar transistor (IGBT) or a metal oxide semiconductor field-effect transistor (MOSFET) associated with protection circuits for protecting it both from voltage surges and from current surges, or indeed it comprises merely an electromechanical component.

BRIEF DESCRIPTION OF THE DRAWINGS

The characteristics and advantages of the present invention appear more clearly from the following description given by way of non-limiting indication, and with reference to the accompanying drawings, in which.

DETAILED DESCRIPTION OF A PREFERRED EMBODIMENT

Figure 1:
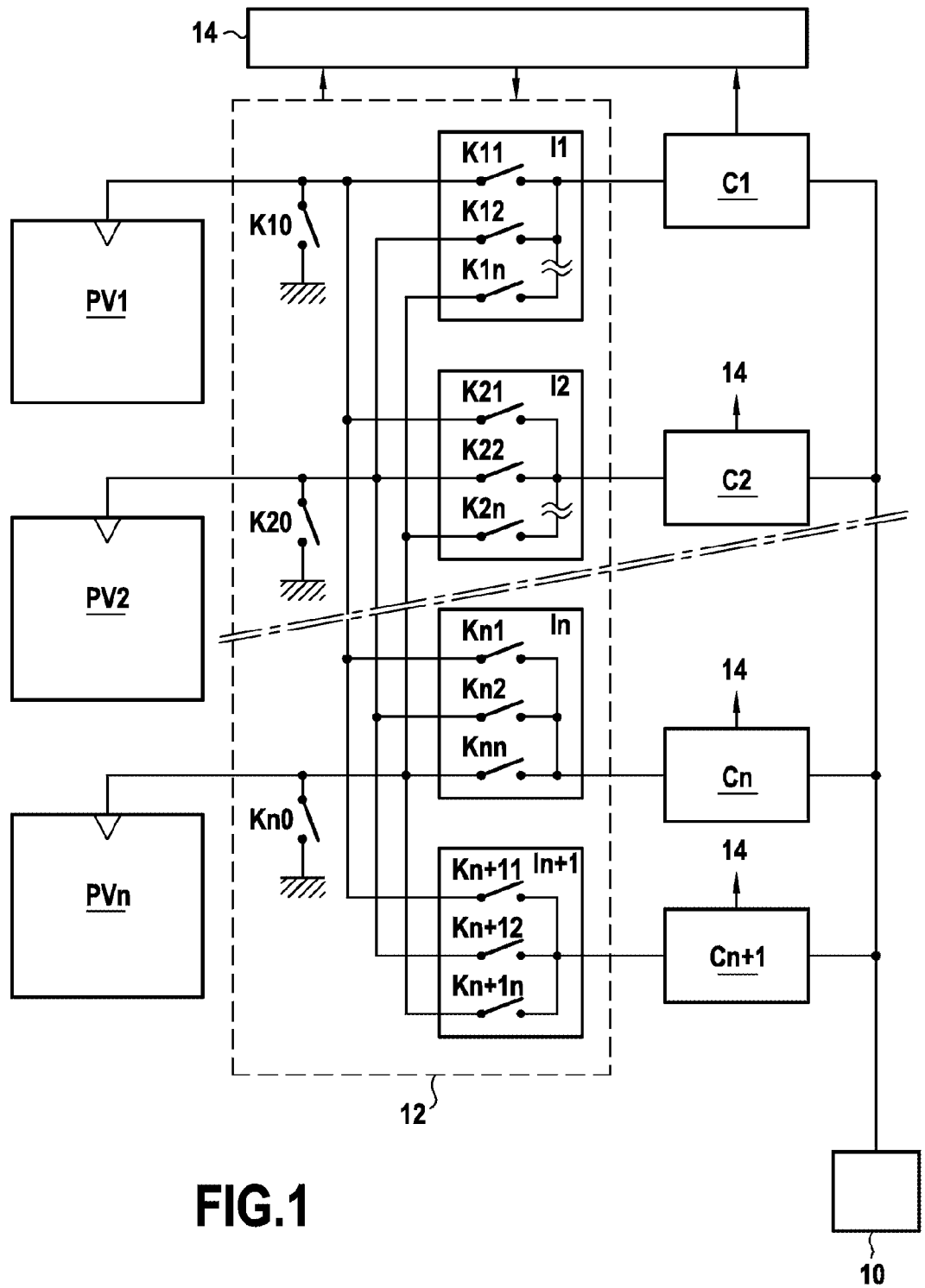
FIG. 1 shows an embodiment of a solar installation implementing a matrix connection device of the present invention.

FIG. 1 diagrammatically shows a solar installation in which a plurality of photovoltaic panels PV1, PV2 to PVn are connected to a corresponding plurality of power converters C1, C2 to Cn for the purpose of powering a common load (use) 10. Depending on the nature of the load, these power converters may be direct current to direct current (DC/DC) converters or direct current to alternating current (DC/AC) converters. This energy conversion installation with its n photovoltaic panels is naturally mentioned by way of illustration and any other installation based on other types of unidirectional energy sources is possible.

In accordance with the invention, this link is set up through a matrix connection device 12 comprising n matrix switch units I1, I2 to In, each of which has n link switches Ki1, Ki2 to Kin having their outlets connected together and having their n inlets connected to the n outlets of the photovoltaic panels. More precisely, the outlet of the first photovoltaic panel PV1 is connected to each of the first switches Ki1 of each of the matrix switch units I1, I2 to In, the outlet of the second photovoltaic panel PV2 is connected to each of the second switches Ki2 of each of the matrix switch units I1, I2 to IN, and so on until the outlet of the $n^{th}$ photovoltaic panel PVn, which is connected to each of the $n^{th}$ switches Kin of each of the matrix switch units I1, I2 to In.

In addition, N short-circuit switches K10, K20 to Kn0 are also provided for short-circuiting the outlet of each of the photovoltaic panels. The switches are controlled using a predetermined control relationship from a monitoring and control circuit 14 receiving a variety of information from said switches and from the power converters. More precisely, said monitoring and control circuit firstly receives the value of the current passing through each of the short-circuit switches K10, K20 to Kn0 when they are closed and that corresponds to the short-circuit current of the photovoltaic panel to which a given switch is connected, and secondly the value of the outlet current from each of the converters C1, C2 to Cn.

The matrix connection device further comprises an additional power converter Cn+1 having its outlet also connected to the load 10 and having its inlet connected to the outlet of an additional switch unit In+1 comprising n switches Kn+11, Kn+12 to Kn+1n having their outlets connected together and their n inlets connected to respective ones of the n photovoltaic panels.

Preferably, each of the switches is implemented using an electronic component incorporating an IGBT or a MOSFET, and, in known manner, includes protection circuits for protecting it from voltage surges and from current surges. However, an implementation using electromechanical components (relays, etc.) is also quite possible.

Figure 2:
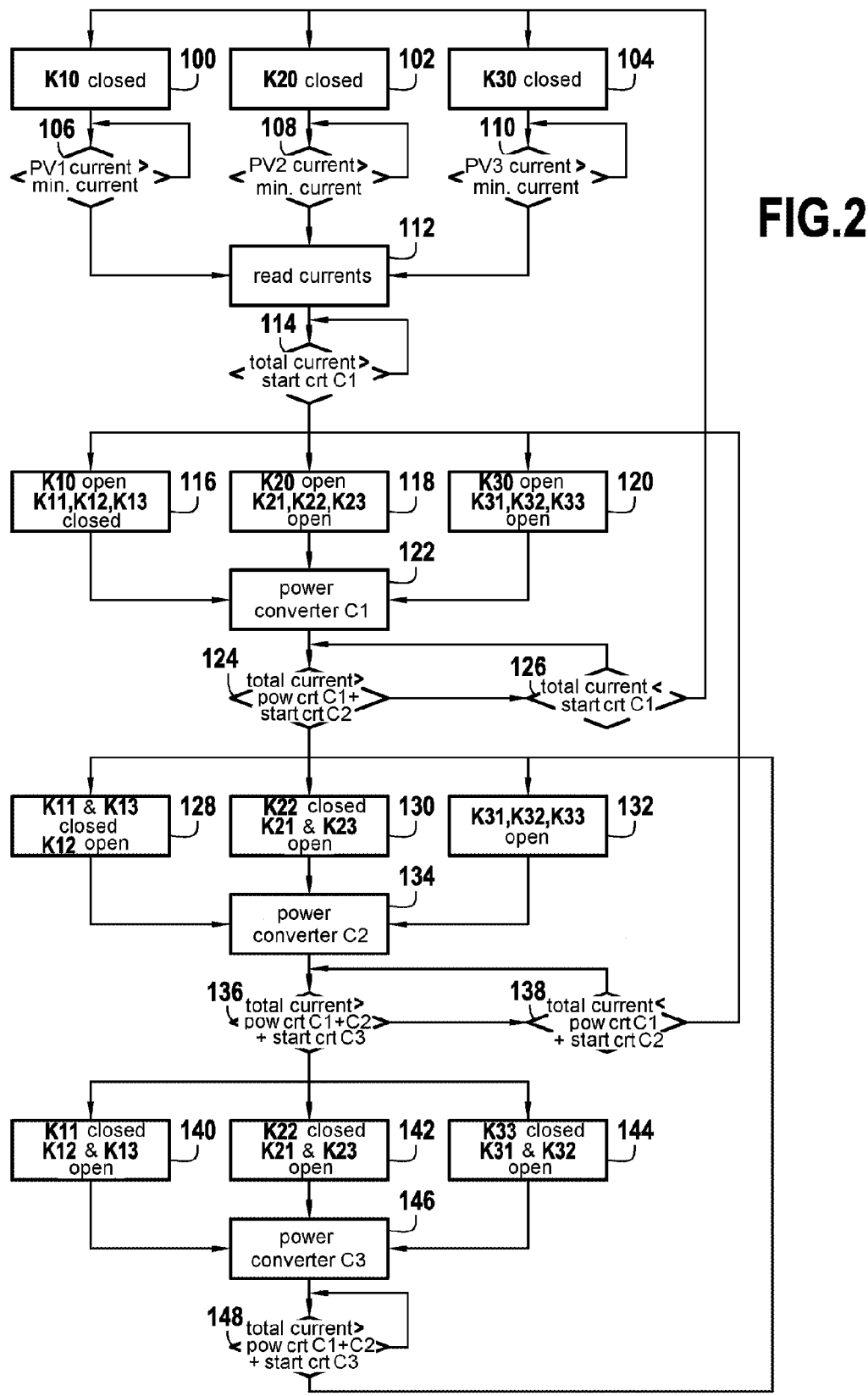
FIG. 2 is a flow chart showing the various steps making it possible to power 3 converters from 3 photovoltaic panels.
Figure 3:
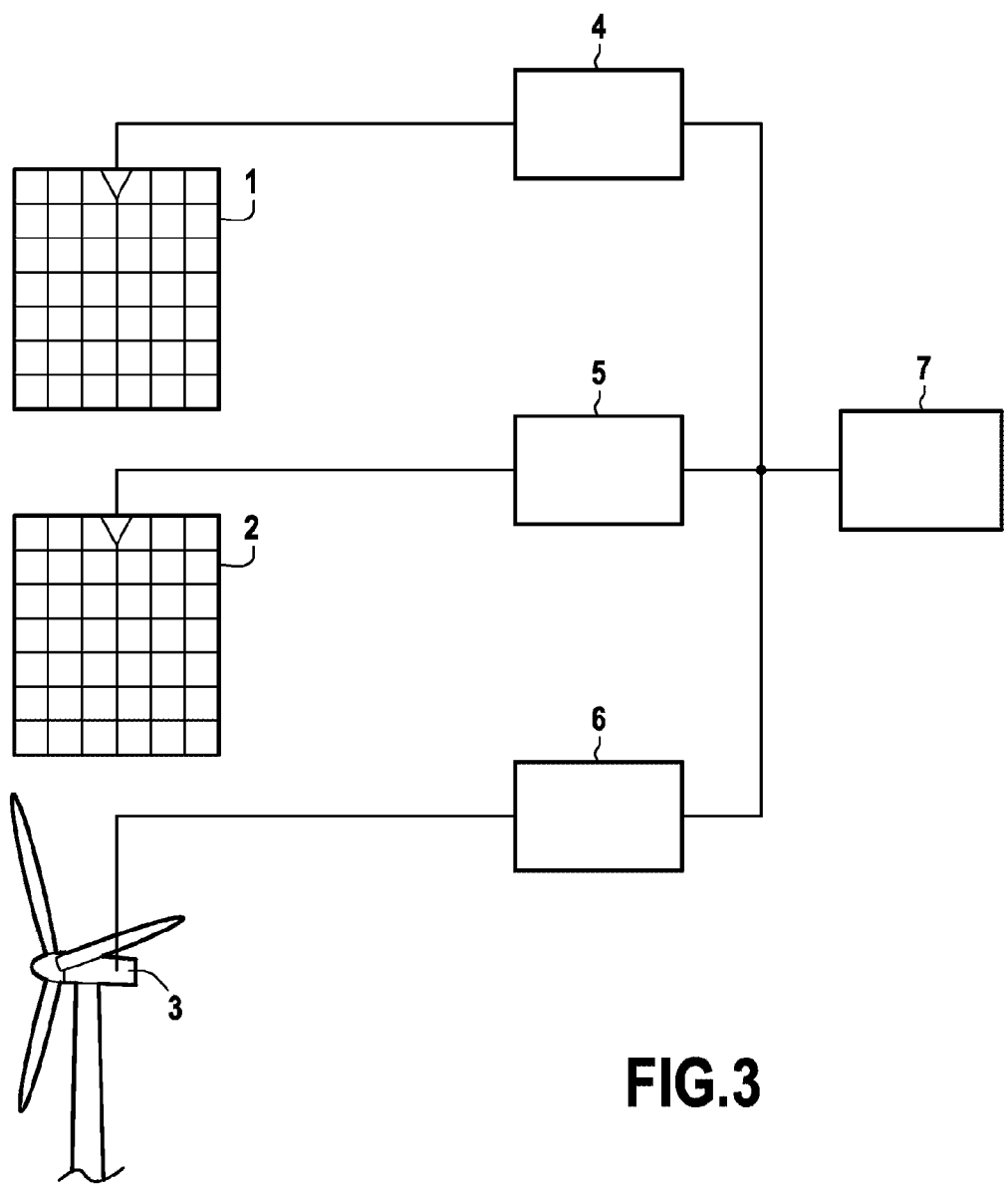
FIG. 3 is an example of a prior art combined solar/wind installation.

Operation of the matrix connection device of the invention is explained below with reference to FIG. 2, which shows a flow chart for controlling three converters powered from three photovoltaic panels. Naturally, the method described below is applicable to n photovoltaic panels. Similarly, it can be generalized to all unidirectional energy sources and in particular to wind turbines, provided that a short-circuit current proportional to the available power is available at said other sources.

It is assumed that the initial state corresponds to absence of insolation (e.g. nighttime). In this state, the short-circuit switches K10 (step 100), K20 (step 102) to K30 (step 104) are closed (the converters C1, C2, and C3 are stopped) and remain closed so long as the value of the current that is flowing through said switches and that is proportional to the available power from the photovoltaic panel is not greater than a predefined minimum determined value corresponding to its minimum operating power (tests of steps 106, 108, 110). When one or more of the collected values are greater than said predefined value, the value(s) is/are transmitted to the circuit 14 (step 112) and when the total value of the currents exceeds the minimum current necessary to start up the first converter C1 (test of step 114), then the short-circuit switches K10, K20 and K30 are opened and the three switches K11, K12, and K13 of the first link switch unit I1 are closed (step 116), the other three switches K2$i$ and K3$i$ ($i$=1 to n) of the other two switch units I2 and I3 remaining open (steps 118 and 120), making it possible to power the first converter C1 (step 122) directly from the three photovoltaic panels that are connected in parallel in this way.

Thus, unlike in the prior art, in order to start up a first converter, it is no longer necessary to wait for the photovoltaic panel to which it is connected to generate, by itself, the available power necessary for such start-up, but rather it suffices to obtain such necessary available power by connecting a sufficient number of photovoltaic panels in parallel, subject to the power emitted by each of the selected panels being greater than its minimum power for operating on its own. Even a small amount of insolation then suffices for starting up at least one converter of the solar installation.

So long as the available power is not sufficient to start up the second converter (answer to the test of step 124 "no") and subject to it not falling back below its minimum start-up power (step 126), in which case the first converter C1 is stopped and the short-circuit switches are closed again, and the first converter C1 remains the only converter active. When the available power is sufficient for starting up the second converter (answer to the test of step 124 "yes"), the switch K12 of the first switch unit I1 is opened (step 128), and, in parallel, the switch K22 of the second switch unit I2 is closed (step 130), making it possible to power the second converter C2 (step 134), the three switches K3$i$ ($i$=1 to n) of the third switch unit I3 remaining open (step 132), as above.

So long as the available power is not sufficient to start up the third converter (answer to the test of step 136 "no") and subject to it not falling back below its minimum start-up power (step 138), in which case the second converter C2 is stopped and the short-circuit switches K12 and K22 are closed again and opened again respectively, said second converter C2 remains active. When the available power is sufficient for starting up the third converter (answer to the test of step 136 "yes"), the switch K13 of the first switch unit I1 is opened (step 140), and, in parallel, the switch K33 of the third switch unit I3 is closed (step 144), making it possible to power the third converter C3 (step 146), the switch K22 of the second switch unit I2 remaining closed (step 142), as above. All three converters thus remain in operation so long as the available power from the third converter remains greater than its start-up power (test of step 148). Otherwise, said third converter is stopped and the switches K13 and K33 are closed again and opened again respectively in order to return to operation with the two converters C1 and C2 only. In practice, the monitoring and control circuit 14 optimizes the efficiency of the converters by deciding whether or not to close the various switches in such a manner as to direct the energy coming from the photovoltaic panels to the appropriate number of converters. The power of the converters is calculated simply on the basis of the product of their outlet current multiplied by the common outlet voltage across the terminals of the load 10.

It should be noted that the presence of an additional power converter Cn+1 having its outlet connected to the load 10 and having its inlet connected to the outlet of the additional switch unit In+1 at the matrix connection device of the invention makes it possible advantageously to replace a defective converter and thus to continue to use all of the power delivered by the photovoltaic panels. Naturally, the use of a plurality of additional converters rather than using a single additional converter is also possible, in particular in the event of high power that requires numerous converters to be used.

It can also be noted that, when the number n is high, and depending on the respective levels of insolation of the photovoltaic panels, it is not necessary to open the switches K1$i$ ($i$=1 to n) of the photovoltaic panels that have not reached their minimum operating power, and the number of photovoltaic panels that are connected in parallel can then be less than n.

Finally, it should be noted that, although in the above description, the available power for starting up the converters is determined on the basis of the values of the short-circuit currents measured in the short-circuit switches at the outlets of the photovoltaic panels, it is also possible to determine it on the basis of an insolation measurement obtained merely from insolation sensors disposed in association with said panels. In the event that other types of unidirectional energy source, such as wind turbines, are used, when a short-circuit current value is not accessible, a sensor for measuring the wind speed may then be used to determine said available power.

The invention claimed is:

1. A matrix connection device disposed between n unidirectional energy sources (PV1, PV2, PVn) and at least n+1 power converters (C1, C2, Cn, Cn+1) for the purpose of powering a common load (10), said device being characterized in that it comprises:

n matrix switch units (I1, I2 to In), each of which comprises n link switches (Ki1, Ki2 to Kin) having their outlets connected together and having their n inlets connected to the n outlets of said unidirectional energy sources, the outlet of the first unidirectional energy source (PV1) being connected to each of the first switches (Ki1) of each of the matrix switch units (I1, I2 to In), the outlet of the second unidirectional energy source (PV2) being connected to each of the second switches Ki2 of each of the matrix switch units (Ii, I2 to In) and so on to the outlet of the $n^{th}$ unidirectional energy source (PVn) that is connected to each of the $n^{th}$ switches (Kin) of each of the matrix switch units (I1, I2 to In);

at least one additional switch unit (In+1) comprising n switches ($K_{n+1}1$, $K_{n+1}2$ to $K_{n+1}n$) having their outlets connected together and their n inlets connected to respective ones of the n outlets of said unidirectional energy sources; and a monitoring and control circuit (14) for starting up or not starting up said power converters as a function of the power available at each of said unidirectional energy sources, and then for keeping them switched on or for deactivating them as a function of the power consumed by each of them;

wherein n is greater than 1.

2. A matrix connection device according to claim 1, characterized in that it further comprises n power sensors disposed in association with said n unidirectional energy sources so as to enable said available power to be measured.

3. A matrix connection device according to claim 2, characterized in that said power sensor is formed by an insolation sensor or by a sensor for measuring the speed of the wind.

4. A matrix connection device according to claim 1, characterized in that it further comprises n short-circuit switches (K10, K20 to Kn0) for short-circuiting the outlet of each of said unidirectional energy sources, thereby enabling said available power to be measured.

5. A matrix connection device according to claim 1, characterized in that each of said switches comprises an IGBT or a MOSFET associated with protection circuits for protecting both against voltage surges and against current surges.

6. A matrix connection device according to claim 1, characterized in that each of said switches comprises an electromechanical component.

7. A matrix connection device according to claim 1, characterized in that said unidirectional energy sources are photovoltaic panels or wind turbines or a combination of both.

8. An energy conversion installation including a matrix connection device according to claim 1 for powering power converters from unidirectional energy sources.

\* \* \* \* \*